Patented Aug. 1, 1950

2,517,235

UNITED STATES PATENT OFFICE 2,517,235

METHOD OF MAKING MINERAL PLASTIC

Harold Ladd Pierce, Pasadena, Calif.

No Drawing. Application February 18, 1947,
Serial No. 729,403

3 Claims. (Cl. 106—86)

My invention relates to building material, and more particularly to a thermosetting mineral plastic material that may be molded or extruded into structural shapes including blocks, bricks, facings, and wall-boards, and to a method of preparing this material.

It is a general object of my invention to provide a mineral plastic for structural purposes that is extremely light in weight.

Another object of my invention is to provide a structural mineral plastic that sets within a relatively few hours compared to concrete and other commonly used materials requiring several weeks or more for useful strength.

Another object of my invention is to provide a thermosetting mineral plastic from which structural shapes may be fabricated.

Still another object of my invention is to provide production methods for producing a quick setting mineral plastic.

Still another object of my invention is to provide structural shapes such as blocks, bricks, facings, and wall-boards made from a quick setting mineral plastic.

Other objects and advantages of my invention will be apparent from the following description and claims.

My building material utilizes igneous and calcareous substances as raw material, the igneous material being heat treated and then combined with a calcareous material in a hydrating atmosphere at a temperature on the order of several hundred degrees Fahrenheit. While the mixture is in a plastic condition it may be extruded, molded, or otherwise shaped, and the material thus shaped may be cured in a matter of hours by again subjecting it to a hot hydrating atmosphere.

While various igneous rocks may be used as one of the raw materials, I prefer to utilize the fine-grained rocks of the syenitic or granitic types or clans, particularly the vitreous rocks of these groups. I have successfully utilized a species of volcanic glass generally known as perlite or perlitic pitchstone. While the constituents of such rocks may vary considerably within their igneous acid or igneous neutral classifications, I prefer to utilize perlitic material having a high proportion of the silica content combined as sodium aluminum silicate. It should also be noted that the feldspar rocks such as albite also include a large proportion of silica combined as sodium aluminum silicate.

The perlitic rocks have the characteristic commonly found in other igneous rocks of changing their physical characteristics when subjected to a high temperature in excess of a red heat. The rock may be first crushed to obtain any desired degree of division, and I have found that particles of the size of sand or fine gravel are satisfactory for practicing my invention. The heating of these grains of rock causes them to expand and thereby become cellular granules.

These exploded grains or cellular granules may be selected by size according to the desired resultant mass of the finished product. They may then be heated to a temperature of several hundred degrees Fahrenheit, or may be taken while still hot from the expanding process and mixed with hot hydrated lime. The lime may be heated independently, or the required heat may be obtained by a rapid hydration of burnt lime or quicklime (CaO). This mixture of the hot heat treated igneous material and the hot hydrated lime may be placed in a pressure vessel where the intimate mixing of the two products may be obtained in any suitable manner as by mixing equipment well known in the art. This mixing preferably takes place in a hydrating atmosphere, although hydrated lime with excessive moisture may be utilized in place of the hydrated atmosphere. The temperature during this mixing process should also be maintained at about 300° F. The combination of the hydrating atmosphere and of the desired temperature may be most conveniently obtained by subjecting the mixture and the mixing operation to steam at an elevated temperature such as that obtained by maintaining the entire mixing vessel at a steam pressure of 100 to 150 p. s. i.

When thoroughly mixed in the high pressure steam atmosphere, the material is of plastic consistency and this plastic condition of the mix may be determined by sample. When the desired plasticity is obtained, the hot material may be extruded or pressed in molds to any desired shape. For example, it may be extruded into bricks or slabs, or it may be pressed into a hollow building block or wall-board.

The shapes thus formed may be caused to set up with extreme hardness by continuing the heat. Accordingly the shaped structural elements may be disposed within an autoclave where they may be subjected to steam at a pressure from 100 to 150 p. s. i. This heat treatment will cure the blocks or shapes in from four to eight hours, depending upon the sectional density of the shapes.

The resultant product is pure white in color and has a hard glazed surface. The average weight of the blocks thus formed may be from thirty to fifty pounds per cubic foot. Mortar bonds to blocks formed from my plastic, and since there is inherent great strength in the blocks, they are ideally suited for all types of structural building.

The foregoing general description may be followed with satisfactory results, and accordingly is a full and complete description for those skilled in the art. However, for those who desire a detailed description of one satisfactory specific form of my invention, I will describe the method of preparation when the igneous material perlite is utilized.

Perlite rock may be obtained from any suitable source, and may be pulverized. Particles having a size that will pass through a 20- to 8-mesh screen may be selected from the pulverized material, and may then be preheated to a temperature of 700° F. to 1200° F. for 1 to 5 minutes, depending upon the type of perlite. The hot material may then be flash heated for 2 to 5 seconds at a temperature from 1800° F. to 2100° F. These heating processes may take place in a rotary kiln and the expansion may be aided by a slight vacuum within the kiln. This heat treatment of the perlitic material causes it to expand and have a generally rounded cellular structure with a minimum of cracked cells and with a minimum of dust.

The expanded perlitic material may then be selected according to size, two parts that will pass 8-mesh screen and will not pass 20-mesh screen two parts that will pass a 20-mesh screen and will not pass a 60-mesh, and two parts that will pass a 60-mesh screen. These six parts of expanded perlite will have an average density of 10 pounds plus or minus one pound per cubic foot. These six parts of expanded perlite may then be heated between 200° and 300° F. and introduced into a pressure vessel to which one part by volume of hydrated lime may be added. The mixing of the lime and expanded perlite may then take place within the pressure vessel, and during this mixing operation the vessel may be closed and subjected to steam under a pressure of about 150 pounds. This steam will have a temperature of about 365° F. and will also furnish a hydrating atmosphere. After the mixing has proceeded for a sufficient length of time to insure an intimate mixture of the expanded perlite and the lime, the pressure vessel may then be opened and the mixture sampled. When a good pasty consistency is found to exist, the material may be removed from the pressure vessel mixer and extruded or pressed into molds. The plasticity of this material to be molded should be such that the extruded shapes or the blocks will retain their shape, as is common with all forms of pressing or extrusion in the building industry.

The blocks and other shapes thus formed may next be placed in an autoclave and steam at 150 pounds pressure may be injected into the autoclave. A curing action takes place in the autoclave that results in a complete setting of the material in four to eight hours for building shapes of ordinary size. The blocks thus cured are ready for immediate use, and there is no prolonged period of curing as is required for cement blocks which may often take as long as two weeks to a month.

I am not certain of the chemical nature of the resultant material, nor am I certain of the chemical processes that take place during the mixing and thermal hardening of my plastic structural material. I believe, however, that the expansion of the igneous material causes a chemical as well as a physical change in the perlitic grains. This chemical change may be akin to that that takes place during the klinkering operation of manufacturing Portland cement. The reaction of the lime with the expanded igneous material is definitely not a carbonating action, inasmuch as there is no appreciable amount of carbon dioxide available, particularly when the mixing and subsequent treating takes place in a steam atmosphere. The reaction may be akin to that generally attributed to the initial setting action in Portland cement; namely, the hydration of the aluminum silicates present in the expanded perlite, and particularly the sodium aluminum silicates. There may also be present a chemical reaction of the calcium in the hydrated lime with the complex silicates of the expanded perlite which may give a chemical compound akin to that present in Portland cement. Accordingly there may be additional reactions similar to those occurring in Portland cement, although there is some doubt as to the more time-consuming reactions inasmuch as my material has a high early strength evident after the indicated curing time of from four to eight hours. Also, the hydraulic limes appear to be more effective, and accordingly are preferred by me particularly for waterproof work.

In any event the end product in the form of fabricated shapes is characterized by extreme lightness in weight as indicated (40 to 50 pounds per cubic foot), making the blocks considerably lighter than water. Where a high density is desirable for any reason, finely divided powder of the original raw material may be added which will give a high density because it will not be in its expanded form. The addition of popped or exploded fines results in an extremely fine and glossy finish apparently due to the reaction between the fines and the lime.

My structural plastic is a novel improvement over concrete and similar fluid structural materials in that the basic constituent, namely the expanded igneous rock, acts not only as the aggregate for the final product, but also is an active component for binding the entire mass together. Accordingly the interior of the cellular granules may remain completely unaffected by the addition of lime to the mix, while the exterior of the granules reacts chemically to bind the entire mass together. This constitutes a further improvement over conventional plastic building materials such as concrete, inasmuch as there is an integral bonding of the aggregate particle because there is a large contact area on the rough and irregular exteriors of the expanded igneous granules as contrasted to the smooth-surfaced pebbles and stones normally forming a part of concrete.

While I have described my invention with respect to a single detailed description, it is obvious from the general description of my invention that I do not limit myself otherwise than by the terms of the following claims.

I claim:

1. The method of forming a mineral plastic comprising heating perlitic rock to a temperature of about 1900° F. until it becomes cellular, supplying hydrated lime at a temperature of about 300° F., mixing approximately 6 parts of the cellular material at about 300° F. with one part of the lime by volume in a vessel supplied with a steam atmosphere having a pressure of about 150 p. s. i. until the mixture becomes plastic, forming the mixture into shapes when it is plastic, and curing the shapes in a hydrating atmosphere at about 300° F.

2. The method of forming a mineral plastic comprising heating perlitic rock to a temperature of about 1900° F. until it becomes cellular, supplying hydrated lime at a temperature of about 300° F., mixing approximately 6 parts of the cellular material at about 300° F. with one part of the lime in volumetric proportions in a vessel supplied with a steam atmosphere having a pressure of about 150 p. s. i., extruding the mixture into structural shapes when it is plastic, and curing the shapes in a hydrating atmosphere at about 300° F.

3. The method of forming a mineral plastic comprising heating perlitic rock to a temperature of about 1900° F. until it becomes cellular, supplying hydrated lime at a temperature of about 300° F., mixing approximately 6 parts of the cellular material at about 300° F. with one part of the lime in volumetric proportions in a vessel supplied with a steam atmosphere having a pressure of about 150 p. s. i., molding the mixture into shapes when it is plastic, and curing the shapes in a hydrating atmosphere at about 300° F.

HAROLD LADD PIERCE.

REFERENCES CITED

The following references are of record in the file of this patent:

UNITED STATES PATENTS

| Number | Name | Date |
| --- | --- | --- |
| 1,590,132 | Leitsworth | June 22, 1926 |
| 2,105,324 | Huttemann | Jan. 11, 1938 |
| 2,388,060 | Hicks | Oct. 30, 1945 |

FOREIGN PATENTS

| Number | Country | Date |
| --- | --- | --- |
| 499,719 | Great Britain | 1939 |